United States Patent
Gravell et al.

(10) Patent No.: US 6,922,678 B2
(45) Date of Patent: *Jul. 26, 2005

(54) VIRTUAL POSTAGE METER WITH MULTIPLE ORIGINS OF DEPOSIT

(75) Inventors: Linda V Gravell, Sutton, MA (US); Leon A. Pintsov, West Hartford, CT (US); David W. Riley, Easton, CT (US); Brian Romansky, Monroe, CT (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 163 days.

This patent is subject to a terminal disclaimer.

(21) Appl. No.: 10/360,383

(22) Filed: Feb. 6, 2003

(65) Prior Publication Data

US 2003/0120606 A1 Jun. 26, 2003

Related U.S. Application Data (63) Continuation of application No. 09/242,206, filed as application No. PCT/US98/12204 on Jun. 12, 1998, now Pat. No. 6,546,377.
(60) Provisional application No. 60/049,518, filed on Jun. 13, 1997.

(51) Int. Cl.$^7$ .............................................. G07B 17/00
(52) U.S. Cl. .................................................... 705/401
(58) Field of Search ............................ 705/50, 51, 52, 705/60, 75, 76, 401

(56) References Cited

U.S. PATENT DOCUMENTS

| | | | |
|---|---|---|---|
| 4,180,856 A | 12/1979 | Check, Jr. et al. | 705/407 |
| 4,376,299 A | 3/1983 | Rivest | 705/61 |
| 4,376,981 A | 3/1983 | Check, Jr. et al. | 705/401 |
| 4,423,287 A | 12/1983 | Zeidler | 178/22.08 |

(Continued)

FOREIGN PATENT DOCUMENTS

| | | |
|---|---|---|
| EP | 0732673 A2 * | 9/1996 |
| EP | 0833285 | 1/1998 |
| JP | 06-284124 A | 10/1994 |
| WO | WO 98/57303 | 12/1998 |

OTHER PUBLICATIONS

"Information Based Indicia Program (IBIP) Host Specification", United States Postal Service, No. XP–002142880, Oct. 6, 1996.

(Continued)

Primary Examiner—Edward Cosimano
(74) Attorney, Agent, or Firm—Brian A. Lemm; Angelo N. Chaclas (57) ABSTRACT

A system and method of evidencing postage payment includes a local postage printing system requesting to a remote data metering center for the generation of postage evidencing information. The request includes a postage amount to be printed on a mailpiece. The remote data metering center determines a postal origin corresponding to the request for postage evidencing information, then accounts for the postage amount in a general account corresponding to the local postage printing system and in a payment account corresponding to the determined postal origin. The remote data metering center generates postage evidencing information in response to the request. The postage evidencing information includes a digital token and the determined postal origin. The remote data metering center sends the postage evidencing information to the local postage printing system which prints the postage evidencing information and the determined postal origin on the mailpiece.

14 Claims, 4 Drawing Sheets

U.S. PATENT DOCUMENTS

| | | | |
|---|---|---|---|
| 4,556,944 A | 12/1985 | Daniels et al. | 705/407 |
| 4,567,359 A | 1/1986 | Lockwood | 235/381 |
| 4,578,530 A | 3/1986 | Zeidler | 178/22.09 |
| 4,718,506 A * | 1/1988 | Hills | 177/25.15 |
| 4,725,718 A | 2/1988 | Sansone et al. | 235/495 |
| 4,757,537 A | 7/1988 | Edelmann et al. | 380/51 |
| 4,775,246 A | 10/1988 | Edelmann et al. | 705/62 |
| 4,802,218 A | 1/1989 | Wright et al. | 705/60 |
| 4,812,994 A | 3/1989 | Taylor et al. | 364/464.02 |
| 4,831,555 A | 5/1989 | Sansone et al. | 358/1.14 |
| 4,873,645 A | 10/1989 | Hunter et al. | 364/479 |
| 4,873,646 A | 10/1989 | Stoops | 702/67 |
| 4,936,209 A | 6/1990 | Diel | 101/93.01 |
| 5,128,988 A | 7/1992 | Cowell et al. | 379/106.03 |
| 5,146,403 A | 9/1992 | Goodman | 707/102 |
| 5,163,098 A | 11/1992 | Dahbura | 380/24 |
| 5,191,533 A | 3/1993 | Haug | 364/464.03 |
| 5,239,168 A | 8/1993 | Durst, Jr. | 235/432 |
| 5,257,196 A | 10/1993 | Sansone | 364/464.02 |
| 5,319,562 A | 6/1994 | Whitehouse | 364/464.03 |
| 5,410,598 A | 4/1995 | Shear | 380/4 |
| 5,454,038 A | 9/1995 | Cordery et al. | 380/23 |
| 5,491,796 A | 2/1996 | Wanderer et al. | 395/200.09 |
| 5,510,992 A | 4/1996 | Kara | 705/408 |
| 5,526,428 A | 6/1996 | Arnold | 380/25 |
| 5,590,198 A | 12/1996 | Lee et al. | 380/21 |
| 5,625,694 A | 4/1997 | Lee et al. | 380/23 |
| 5,680,463 A | 10/1997 | Windel et al. | 380/51 |
| 5,699,258 A | 12/1997 | Thiel | 364/464.19 |
| 5,774,554 A * | 6/1998 | Gilham | 380/51 |
| 5,781,438 A | 7/1998 | Lee et al. | 705/404 |
| 5,812,401 A | 9/1998 | Moore | 705/410 |
| 5,812,666 A | 9/1998 | Baker et al. | 380/21 |
| 5,812,991 A | 9/1998 | Kara | 235/375 |
| 5,822,739 A | 10/1998 | Kara | 235/375 |
| 5,826,247 A | 10/1998 | Pintsov et al. | 705/404 |
| 5,943,658 A | 8/1999 | Gravell et al. | 705/410 |
| 6,005,945 A | 12/1999 | Whitehouse | 380/51 |
| 6,061,670 A | 5/2000 | Brand | 705/404 |
| 6,064,994 A * | 5/2000 | Kubatzki et al. | 705/410 |
| 6,085,181 A | 7/2000 | Gravell et al. | 705/408 |
| 6,249,777 B1 | 6/2001 | Kara et al. | 705/404 |
| 6,295,359 B1 | 9/2001 | Cordery et al. | 380/44 |
| 6,523,014 B1 * | 2/2003 | Pauschinger | 705/410 |
| 6,546,377 B1 * | 4/2003 | Gravell et al. | 705/60 |

OTHER PUBLICATIONS

Gash, Andy; "What was lick and stick has now become click," ABIX—Australasian Business Intelligence, Apr. 14, 1998, p. 20 (Abstract Only).

"Information Based Indicia Program (IBIP) Indicium Specification," United States Postal Service, Draft dated Jul. 23, 1997.

"Information Based Indicia Program (IBIP) Postal Security Device Specification," United States Postal Service, Draft dated Jul. 23, 1997.

"Information Based Indicia Program (IBIP) Key Management Plan," United States Postal Service, Draft dated Apr. 25, 1997.

* cited by examiner

FIG. 1

| PSA₁ | RNPS₁ | RPO₁₁, RPO₁₂, RPO₁₃, ....RPO₁ₙ |
|---|---|---|
| PSA₂ | RNPS₂ | RPO₂₁, RPO₂₂, RPO₂₃, ....RPO₂ₙ |
| PSA₃ | RNPS₃ | RPO₃₁, RPO₃₂, RPO₃₃, ....RPO₃ₙ |
| PSA₄ | RNPS₄ | RPO₄₁, RPO₄₂, RPO₄₃, ....RPO₄ₙ |
| PSA₅ | RNPS₅ | RPO₅₁, RPO₅₂, RPO₅₃, ....RPO₅ₙ |
| PSA₆ | RNPS₆ | RPO₆₁, RPO₆₂, RPO₆₃, ....RPO₆ₙ |
|  |  | . . . . |
| PSAₓ | RNPSₓ | RPOₓ₁, RPOₓ₂, RPOₓ₃, ....RPOₓₙ |

VIRTUAL POSTAGE METER WITH MULTIPLE ORIGINS OF DEPOSIT

This is a continuation application of application Ser. No. 09/242,206, filed on Dec. 2, 1999, now U.S. Pat. No. 6,546,377, which is a national stage of PCT application No. PCT/US98/12204, filed on Jun. 12, 1998, which is a continuation-in-part application of U.S. Provisional Patent Application Ser. No. 60/049,518, filed Jun. 13, 1997, now abandoned.

TECHNICAL FIELD

The present invention relates generally to a postage metering system and method for evidencing postage payment in an open system and, more particularly, to a postage metering system and method for evidencing postage payment in a virtual meter configuration.

RELATED APPLICATIONS

The present application is related to U.S. patent applications Ser. Nos. 09/242,210 and 09/242,209; and U.S. Pat. Nos. 6,061,670; 6,567,794 and 6,466,921, all being assigned to the assignee of the present invention, all of which are incorporated herein by reference in their entirety.

BACKGROUND ART

Postage metering systems have been developed which employ encrypted information that is printed on a mailpiece as part of an indicium evidencing postage payment. The encrypted information includes a postage value for the mailpiece combined with other postal data that relate to the mailpiece and the postage meter printing the indicium. The encrypted information, typically referred to as a digital token or a digital signature, authenticates and protects the integrity of information, including the postage value, imprinted on the mailpiece for later verification of postage payment. Since the digital token incorporates encrypted information relating to the evidencing of postage payment, altering the printed information in an indicium is detectable by standard verification procedures. Examples of systems that generate and print such indicium are described in U.S. Pat. Nos. 4,725,718, 4,757,537, 4,775,246 and 4,873,645, each assigned to the assignee of the present invention.

Presently, there are two postage metering device types: a closed system and an open system. In a closed system, the system functionality is solely dedicated to metering activity. Examples of closed system metering devices, also referred to as postage evidencing devices, include conventional digital and analog (mechanical and electronic) postage meters wherein a dedicated printer is securely coupled to a metering or accounting function. In a closed system, typically the printer is securely coupled and dedicated to the meter, and printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a postage evidencing device with a non-dedicated printer that is not securely coupled to a secure accounting module. An open system indicium printed by the non-dedicated printer is made secure by including addressee information in the encrypted evidence of postage printed on the mailpiece for subsequent verification. See U.S. Pat. Nos. 4,725,718 and 4,831,555, each assigned to the assignee of the present invention.

The United States Postal Service ("USPS") has proposed an Information-Based Indicia Program ("IBIP"), which is a distributed trusted system to retrofit and augment existing postage meters using new evidence of postage payment known as information-based indicia. The program relies on digital signature techniques to produce for each envelope an indicium whose origin can be authenticated and content cannot be modified. IBIP is expected to support new methods of applying postage in addition to the current approach, which typically relies on a postage meter to mechanically print indicia on mailpieces. IBIP requires printing a large, high density, two-dimensional ("2-D") bar code on a mailpiece. The 2-D bar code encodes information and is signed with a digital signature.

The USPS has published draft specifications for IBIP. The INFORMATION BASED INDICIA PROGRAM (IBIP) INDICIUM SPECIFICATION, dated Jun. 13, 1996, and revised Jul. 23, 1997, ("IBIP Indicium Specification") defines the proposed requirements for a new indicium that will be applied to mail being created using IBIP. The INFORMATION BASED INDICIA PROGRAM POSTAL SECURITY DEVICE SPECIFICATION, dated Jun. 13, 1996, and revised Jul. 23, 1997, ("IBIP PSD Specification") defines the proposed requirements for a Postal Security Device ("PSD"), which is a secure processor-based accounting device that dispenses and accounts for postal value stored therein to support the creation of a new "information based" postage postmark or indicium that will be applied to mail being processed using IBIP. The INFORMATION BASED INDICIA PROGRAM HOST SYSTEM SPECIFICATION, dated Oct. 9, 1996, defines the proposed requirements for a host system element of IBIP ("IBIP Host Specification"). IBIP includes interfacing user, postal and vendor infrastructures which are the system elements of the program. The INFORMATION BASED INDICIA PROGRAM KEY MANAGEMENT PLAN, dated Apr. 25, 1997, defines the generation, distribution, use and replacement of the cryptographic keys used by the USPS product/service provider and PSDs ("IBIP KMS Specification"). The specifications are collectively referred to herein as the "IBIP Specifications".

The IBIP Specifications define a stand-alone open metering system, referred to herein as a PC Meter comprising a PSD coupled to a personal computer ("PC") which operates as a host system with a printer coupled thereto ("Host PC"). The Host PC runs the metering application software and associated libraries (collectively referred to herein as "Host Applications") and communicates with one or more attached PSDs. The PC Meter can only access PSDs coupled to the Host PC. There is no remote PSD access for the PC Meter.

The PC Meter processes transactions for dispensing postage, registration and refill on the Host PC. Processing is performed locally between the Host PC and the PSD coupled thereto. Connections to a Data Center, for example for registration and refill transactions, are made locally from the Host PC through a local or network modem/internet connection. Accounting for debits and credits to the PSD is also performed locally, logging the transactions on the Host PC. The Host PC may accommodate more than one PSD, for example supporting one PSD per serial port. Several applications programs running on the Host PC, such as a word processor or an envelope designer, may access the Host Applications.

The IBIP Specifications do not address an IBIP open metering system on a network environment. However, the specifications do not prohibit such a network-based system. Generally, in a network environment a network Server PC controls remote printing requested by a Client PC on the network. Of course, the Client PC controls any local printing.

One version of a network metering system, referred to herein as a "Virtual Meter", has many Host PCs without any PSDs coupled thereto. The Host PCs run Host Applications, but all PSD functions are performed on Server(s) located at a Data Center. The PSD functions at the Data Center may be performed in a secure device attached to a computer at the Data Center, or may be performed in the computer itself. The Host PCs must connect with the Data Center to process transactions such as postage dispensing, meter registration, or meter refills. Transactions are requested by the Host PC and sent to the Data Center for remote processing. The transactions are processed centrally at the Data Center and the results are returned to the Host PC. Accounting for funds and transaction processing are centralized at the Data Center. See, for example, U.S. Pat. Nos. 5,454,038 and 4,873,645, which are assigned to the assignee of the present invention. The Virtual Meter does not conform to all the current requirements of the IBIP Specifications. In particular, the IBIP Specifications do not permit PSD functions to be performed at the Data Center.

Heretofore, each metering device or accounting unit of a postage metering system has had a single origin of deposit, i.e. has been registered at a single post office. The postage funds stored in each metering device has been credited (deposited) for the account of the single post office, which is expected to be handling all mailpieces containing indicia printed by the metering device registered thereto. Thus, for companies or mailrooms requiring different origins of deposit for processing mailpieces, multiple meters have been needed to achieve such multiple origins of deposit. For example, while most meters in a mailroom in Shelton, Conn. may be configured to evidence postage on mailpieces to be deposited in the Post Office in Shelton, Conn., other meters may be configured to evidence postage on mailpieces to be deposited at different origins of deposit, such as New Haven, Conn., which may be open later than the Shelton Post Office.

It is the current practice for a mailer who wishes to deposit mail in several post offices to have a separate meter for each post office. Sufficient funds must be placed in each meter to pay postage for mail deposited at the corresponding post office. If the meters use a conventional meter refill process, such as the Postage By Phone® service provided by Pitney Bowes Inc. of Stamford, Conn., then the mailer must make separate refill calls for each meter. Further, once the funds are placed in a meter, they cannot easily be withdrawn or transferred to another meter. This presents difficulties for mailers who do not necessarily know in advance how much mail they wish to deposit at each post office.

Various Posts, including the United States Postal Service (USPS), are now considering the viability of a virtual postage metering system. One problem presented by a virtual postage metering system is that it is easily transportable because the metering device is not local to the mailer. For example, a travelling mailer using a notebook computer with Host Applications may desire sending mail from the various locations. However, the current zip deposit requirements of the USPS do not allow such movement of the metering process. Once a virtual meter arrangement is configured for an individual or a company for an origin of deposit, such transporting of the virtual postage metering system would violate current USPS regulations.

DISCLOSURE OF THE INVENTION

It has been determined that a virtual postage metering system provides benefits that are not available under conventional postage payment systems. For the Posts, a virtual postage metering system provides central management of all postage without the need to manage physical meters or PSDs. A further benefit is the opportunity to directly associate a mailer to each mailpiece as opposed to each reset. For mailers, no metering hardware, i.e. postage meter or PSD, is needed. Nor do mailers need to maintain current lists of valid addresses, such as with purchased CD-ROMs. Mailers can acquire postage on an as-needed basis. Finally, meter vendors do not have to keep track of physical meters. A virtual postage metering system eliminates stolen or relocated meter problems, and simplifies meter management in general.

It has been found that an accounting process can be implemented in a postage metering device that provides simultaneous registration of the postage metering device at several different post offices. Related U.S. Pat. No. 6,061, 670, assigned to the assignee of the present invention, discloses a system and method whereby the postage metering device can be configured with multiple origins of deposit. The system includes a postal security device (PSD) coupled to a printer module. The PSD includes a first processor, secure accounting module, value storage module and digital signature module. The value storage module includes total postal value information and an origin postal value for each of a plurality of postal origins, wherein the PSD is authorized to dispense evidence of postage payment for each of the postal origins. The PSD performs accounting for each postage evidencing transaction. The accounting includes debiting the total postal value and incrementing one of the origin of postal values corresponding to the postage evidencing transaction. The PSD is registered at each post office corresponding to each of the plurality of postal origins. The method includes selecting one of the postal origins in the accounting module, deducting a requested postal value from a total postal value stored as a general account in the accounting module, adding the requested postal value to a sub-register corresponding to the selected postal origin in the accounting module, generating evidence of postage payment and printing the requested evidence of postage payment and the selected postal origin on the mailpiece. The evidence of postage payment includes a digital token which is an encrypted number generated using information that includes a requested postal value and the selected postal origin. U.S. Pat. No. 6,061,670 is hereby incorporated in its entirety by reference.

Typically, a descending register in the postage metering device is credited for an amount of postage funds during postage refill for the postage metering device. In accordance with previously noted U.S. Pat. No. 6,061,670, the postage metering device also includes a plurality of sub-registers representing one of the several different post offices to which the postage metering device is authorized to use as an origin of deposit. For each transaction, when the descending register is debited for an amount of postage one of the sub-registers is incremented for the same amount for transactions associated with its origin of deposit. At the next postage refill transaction for the postage metering device the total internal transfers to each local post office sub-registers are reported to the refill Data Center, which reports the same to the Postal Service. The Postal Service may then account postage refill funds transfer to the appropriate post office. When franking each mailpiece, the postage metering device prints an origination postal code corresponding to an appropriate post office as part of a digital indicium printed on the mailpiece.

In the present invention, the virtual postage metering system includes a Data Center configured with at least one postage metering account (PSA) associated with each mailer licensed under the virtual postage security system. The PSA includes a plurality of sub-registers associated with a plurality of origins of deposits. The sub-registers may be pre-authorized accounts representing origins of deposit from which the mailer is authorized to deposit mail, or may be accounts created each time a mailer chooses to deposit mail from a new origin of deposit. When the mailer requests postage for a mailpiece, for example, through the mailer's personal computer, the Data Center performs funds accounting and digital token calculations using a mailer's PSA. The digital token includes PSA identification as part of the encrypted information. The Data Center determines the origin of deposit based on the location from which the mailer initiates the request for postage, then performs the accounting in the PSA and the appropriate sub-register, and then generates a token which is then sent to the mailer to be printed on the mailpiece.

The PSA may be a debit account using a refill process similar to that used for traditional meters. In the alternative, the PSA can be a real time payment account that charges postage to a pre-authorized credit account of the mailer. In the preferred embodiment, the Data Center simultaneously charges a mailer's credit card when the token is generated and accounts for the postage amount in the appropriate sub-register for each origin of deposit so that the proper postal accounts can be credited for the postage issued.

Several benefits are realized from the present invention. One such benefit relates to the postal regulations requiring that the postage printed on a metered mailpiece must be obtained from a meter licensed from the local post office at which the mailpiece is deposited for mailing, commonly referred to as "origin of deposit" or "domain". With a PSA at a Data Center and a plurality of sub accounts associated with the PSA, a mailer is not limited to a single origin of deposit or domain. For example, while some mailers may be willing to limit use of the virtual postage metering system to deposit their mailpieces in a single origin of deposit near their workplace, other mailers may desire to deposit their mailpieces at different origins of deposit. For example, a mailer may be travelling with a notebook computer with virtual postage metering system software that would allow access to the Data Center from location associated with other origins of deposit. The present invention provides each mailer with the ability to access his or her PSA at the Data Center from any such locations and to obtain evidence of postage payment that can be printed on the mailpiece and mailed from any of such locations.

The present invention provides a system and method of evidencing postage payment which includes a local postage printing system requesting to a remote data metering center for the generation of postage evidencing. The request includes a postage amount to be printed on a mailpiece. The remote data metering center determines a postal origin corresponding to the request for postage evidencing, then accounts for the postage amount in a general account corresponding to the local postage printing system and in a payment account corresponding to the determined postal origin. The remote data metering center generates postage evidence in response to the request. The postage evidence includes a digital token and the determined postal origin. The remote data metering center sends the postage evidence to the local postage printing system which prints the postage evidence and the determined postal origin on the mailpiece.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

BEST MODE FOR CARRYING OUT THE INVENTION

Figure 1:
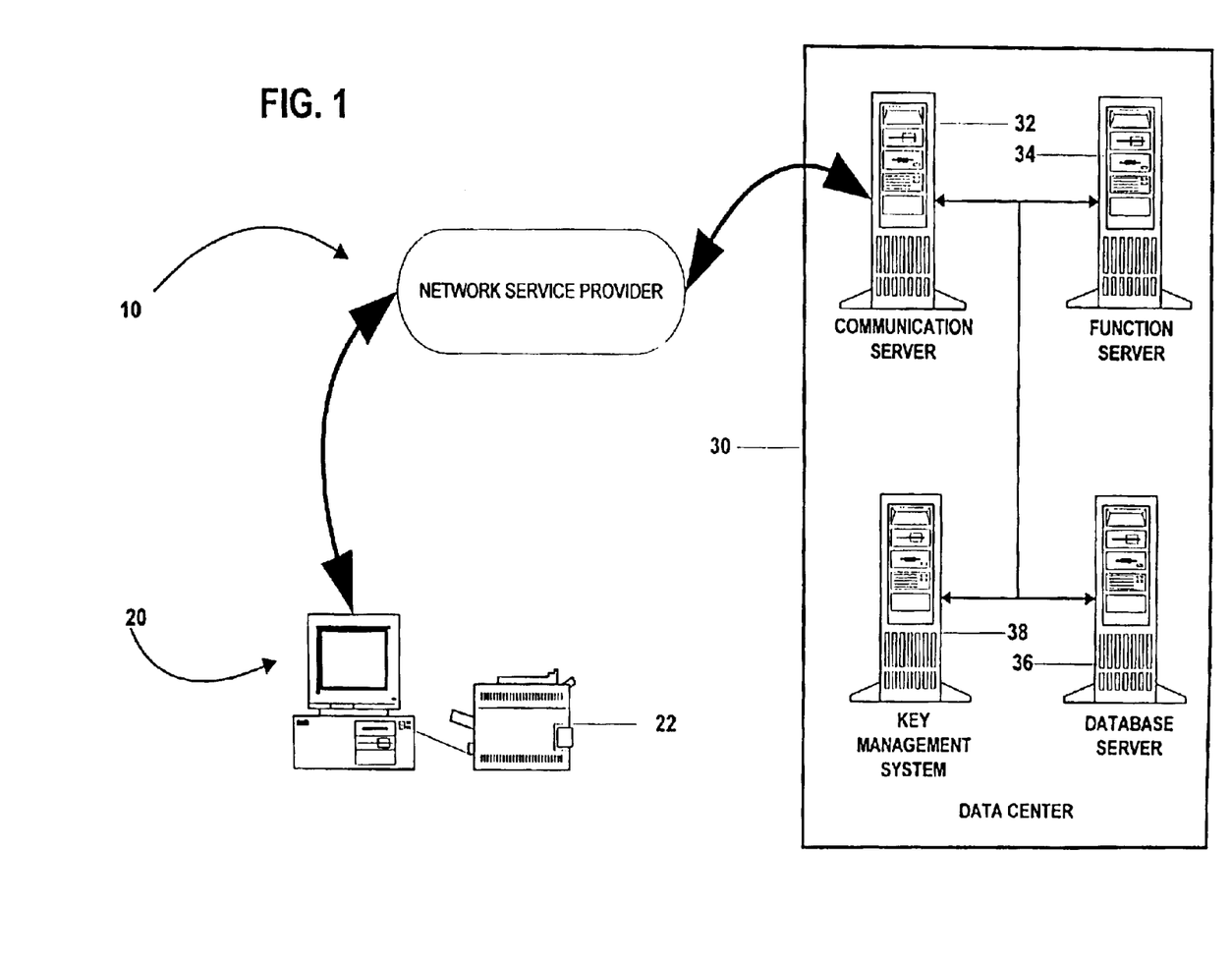
FIG. 1 is a block diagram of a system for dispensing postage embodying the principles of the present invention.

In describing the present invention, reference is made to the drawings, wherein there is seen in FIG. 1, a virtual postage metering system, generally designated 10. The virtual postage metering system 10 includes a plurality (only one is shown) of personal computer (PC) systems, generally designated 20, each having access to a printer 22 for printing evidence of postage on an envelope or label. PC 20 is connected with a transaction processing Data Center 30 that performs postal accounting and evidencing of postage. The virtual postage metering system 10 allows each mailer to use a conventional PC to remotely obtain evidence of postage payment on an as needed basis. Unlike conventional postage metering systems, virtual postage metering system 10 does not include any meter hardware located at the mailer's site. Nor are any postal funds stored at the mailer's site. All the metering and accounting of funds occur at Data Center 30 using functional software and database records representing the mailer's "postage meter". The accounting method for the virtual postage metering system 10 may be a conventional prepayment or post-payment system. However, the preferred embodiment of the present invention is a real-time payment method in which the amount of a transaction is charged to a mailer's credit card account when the transaction occurs. This method is referred to herein as a "trickle charge" postage payment, because the mailer does not pay for postage for a mailpiece until the mailer is ready to print the mailpiece.

In the virtual postage metering system, a "meter" vendor, such as Pitney Bowes Inc., provides the mailer with client software that runs on PC 20. The client software initiates communications with Data Center 30 which performs metering transactions to evidence postage for single mailpieces or batches of mailpieces. In the preferred embodiment, the client software establishes a connection to the Data Center, and requests postage by providing postal information relating to the requested transactions, such as postage amount, addressee information and (optionally) the origin of deposit for each mailpiece. Data Center 30 receives the postal information, determines the origin zip for the mailpiece(s), performs accounting functions and generates an encrypted evidence of postage payment, such as a token or digital signature, and sends indicium information including the token, to PC 20. The encrypted evidence of postage payment can include, for example, at least part of the addressee information, i.e., the destination address of the mailpiece, and the determined postal origin. PC 20 receives the indicium information, creates an indicium bitmap, which can be displayed on a PC monitor (not shown) and printed on the mailpiece by printer 22. PC 20 then disconnects from Data Center 30 or requests another transaction. The connection between PC 20 and Data Center 30 may be through a Network Service Provider, such as on the Internet, or by direct dial using the PC's modem.

Virtual postage metering system 10 eliminates the need to maintain and account for traditional metering devices at each mailer's site and provides flexibility for handling requests from multiple origins of deposit by each mailer. Virtual postage metering system 10 also provides value added services that are not available with conventional meter devices, such as, real-time address hygiene, direct marketing services and trickle charge postage payment. Virtual postage metering system 10 provides user authentication by Data Center 30 to identify mailers with valid accounts. When a mailer has been authenticated for each request, for example, by a user name, password or other conventional methods, Data Center 30 services the request, and returns indicium information to the PC 20 where the indicium is created and printed on the mailpiece.

Referring again to FIG. 1, the mailer initiates a postage evidencing transaction by running client software in PC 20, which contacts Data Center 30. At Data Center 30, a Communication Server 32 supports connectivity from various communication technologies and protocols. The Communication Server merges all incoming traffic and routes it to a Function Server 34, which supports mailer sign-on, postage dispensing and postal reporting. All mailer information,, including use of public or private keys, is accessed from a Database Server 36 where the mailer information is securely stored using secure cryptographic processes and protocols. (It will be understood that, for security purposes, some information may be stored in a secure device or location, such as the Key Management System 38.) All sensitive cryptographic processes occur in the Key Management System 38, which includes a secure, tamper-evident and tamper-responding enclosed area.

Mailers establish accounts through an on-line sign-up process with Data Center 30. During sign-up, the mailer enters, at PC 20, account information, such as user name, password and method of payment. Any registration fees can be charged at this time. Data Center 30, preferably administered by a meter vendor, such as Pitney Bowes Inc., arranges all meter licenses and agreements between its mailers and the Post.

In the preferred embodiment, the method of payment is a real-time, trickle charge, for example to the mailer's credit card, wherein the credit card is charged only for the postage dispensed for evidencing before the evidencing occurs. Alternatively, a traditional prepayment method may be used, wherein each mailer is required to put a minimum amount of money into the mailer's virtual meter account. As account funds drop below a specific level a refill is charged against the mailer's account.

In previously noted U.S. Pat. No. 6,061,670, a meter (or PSD) is registered at several different post offices. The meter has internal sub-registers corresponding to each post office for which the meter is authorized. The meter further has a register for the national postal service. When the customer makes a refill call, the meter reports the status of each sub-register to the refill Data Center. Funds are transferred by a refill transaction to the national postal service register. Status of the sub-registers is reported from the refill Data Center to the national postal service to allow the postal service to account for postage at each local post office.

In the present invention, the PSD does not exist, i.e., there is no metering device coupled to the PC from which postage payment is requested. Virtual postage metering system 10 replaces the accounting and metering functions of the PSD with metering software at PC 20 and mailer account information performed and updated at Data Center 30.

In accordance with the present invention, virtual postage metering system 10 provides each mailer with a metering system that has the capability of originating transactions from multiple origins of deposit. In one embodiment, which is analogous to the metering system disclosed in previously noted U.S. Pat. No. 6,061,670, the PSA is registered at several different post offices and has internal sub-registers corresponding to each post office for which the PSA is authorized. When the mailer requests postage evidencing from the Data Center, the Data Center determines the origin of deposit based on where the mailer originates the request for postage, or alternatively from the request itself, and, if the PSA is authorized for such origin of deposit, the Data Center completes the generation of postage evidencing and accounts for the amount of postage accordingly in the PSA and sub-register corresponding to the origin of deposit.

In the preferred embodiment, there is no need for pre-authorized origins of mailing. Once the Data Center determines a valid origin of deposit based on where the mailer originates the request for postage, the Data Center completes the generation of postage evidencing and accounts for the amount of postage accordingly in the PSA and sub-register corresponding to the origin of deposit. Such accounting is described in more detail below.

Various methods can be used to determine the origin of deposit for a requested transaction. For example, a method for determining origin zip code using a caller ID from a telephone call is disclosed in U.S. Pat. No. 5,943,658, assigned to the assignee of the present invention, which is hereby incorporated in its entirety by reference. Specifically, if a transaction is requested via a modem connection over a standard telephone line, the Data Center determines the phone number from which the customer is placing the call using the Caller ID feature that is present in most phone systems. This is usually accomplished by demodulating the data sent between the first and second ring. This data contains the phone number which originated the call and the time of the call.

Once the phone number has been determined, a national phone directory (which is currently available on CD-ROM) is used to determine the address from which the call is being placed. After the address has been determined, the ZIP code from which the call originated may be determined by accessing a similar national database of ZIP codes (also currently available on CD-ROM). For other types of connections (such as a network or the Internet) the origin of deposit may be determined using appropriate databases that already exist or which can be easily created (such as network ID or internet address). For example, if the communication is via a network, the network address can be used as the identifier to determine the origin of deposit for a requested transaction. Of course, a mailer can enter the origin of deposit through the PC, or the Data Center can determine origin of deposit from return address information provided by the mailer. However, it will be appreciated that the latter methods are less reliable.

Figure 2:
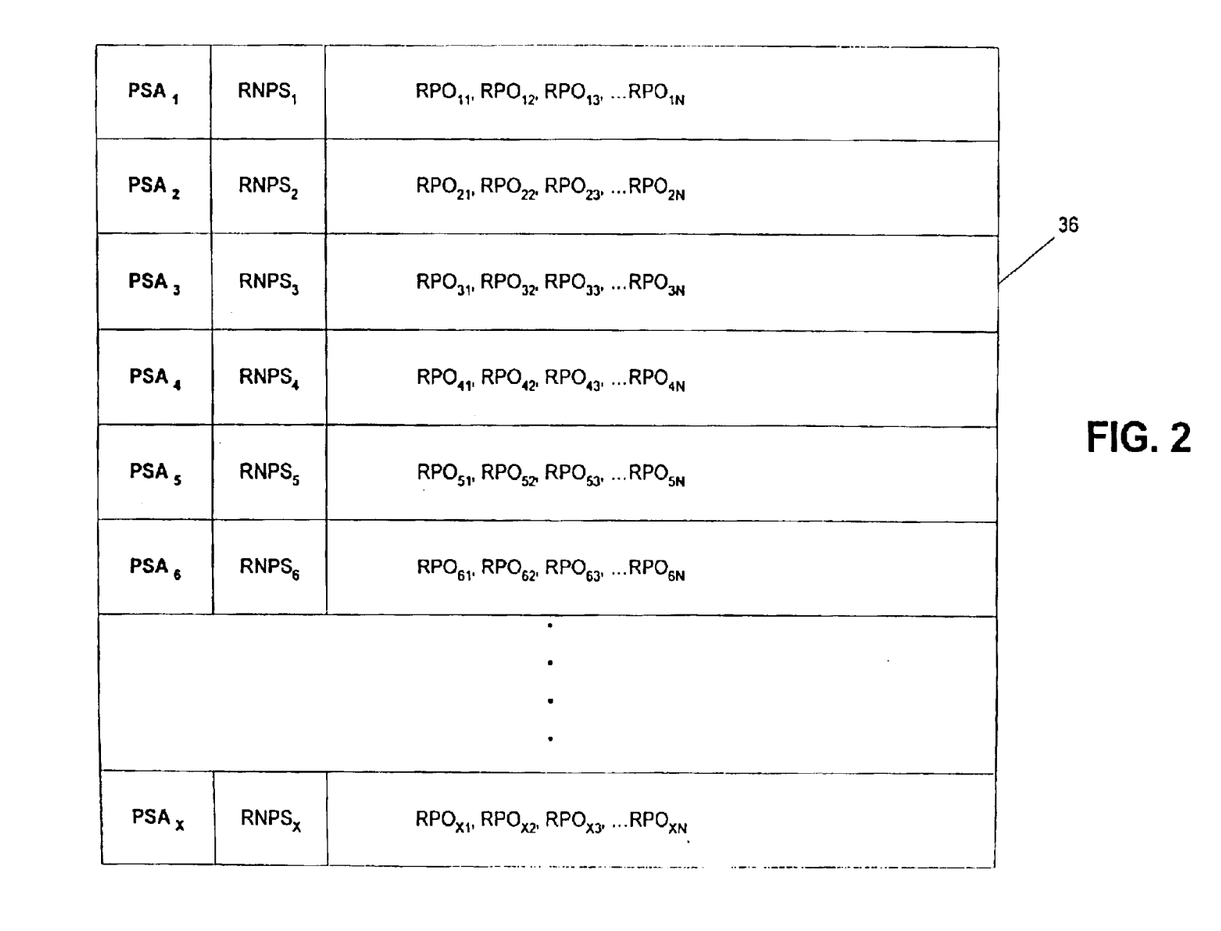
FIG. 2 is a block diagram of the Data Center Database for virtual postage metering system with multiple origins of deposit for each account.

Referring now to FIG. 2, the Database Server 36 file structure is shown. The database comprises a plurality of PSAs (postal security accounts), each PSA representing a metering account administered by Data Center 30. Each PSA has a register (RNPS) for the national Postal Service.

Each PSA is also registered at up to (N) different post offices ($PO_1$, $PO_2$, $PO_N$), i.e., origins of deposit. Each PSA has internal sub-registers ($RPO_1$, $RPO_2$, ... $RPO_N$) corresponding to each post office for which the PSA is authorized. In the preferred embodiment of the present invention, each PSA has an RPO for each valid origin of deposit. For each postage evidencing transaction, the Data Center accounts in the RNPS of a PSA and in one of the RPO for postage evidenced. Thus, the present invention allows a request for evidence of postage to include an origin of mailing other than the origin of mailing for a master postal register of the PSA. An alternate file structure for Database Server 36, each PSA includes a national Postal Service register. However, instead of the sub-registers in each PSA, Database Server 36 has a separate account register for each origin of deposit in which real-time accounting occurs for each transaction for an origin of deposit.

The Function Server at the Data Center performs the accounting and postage evidencing generation functions and stores transaction and accounting information in the PSA and the appropriate sub-registers.

At some predetermined interval, such as daily or when the refill of the PSA occurs, Data Center 30 reports the status of PSA and each RPO to the Postal Service. In the preferred embodiment of a trickle charge method of payment, since credit card transactions have accounted for all postage payment being reported, the Postal Service verifies payment of total transactions being reported and assigns funds from such payment to the appropriate local post offices. When a prepayment method is being used, Data Center initiates the transfer of funds to the Postal Service accordingly. The mailer requests funds transferred to the RNPS register. The funds are transferred by a refill transaction to the national postal service register. Reports of the sub-registers ($RPO_1$, $RPO_2$, $RPO_N$) are reported from the refill Data Center to the national Postal Service to allow the Postal Service to account for postage at each local post office. The register RNPS may have ascending and descending registers. The RPO registers may simply be a total of postage evidenced for mail destined for the corresponding post office.

The foregoing description of the preferred embodiment of the present invention makes use of existing infrastructure of the current postal system for post payment to local post offices. It will be understood that the current infrastructure could be bypassed by implementing a method for direct payments to local post offices at the time the transaction is evidenced.

When an amount of postage needed for each transaction is determined, for example, by specific request by the mailer or by automatic determination at the Data Center, the amount of postage may be deducted from the mailer's PSA in a pre-payment method, added to the mailer's PSA in a post-payment method or charged directly to a pre-authorized credit card of the mailer in a real-time payment method. In the latter and preferred method, the PSA contains no funds until the time of postage evidencing at which time postage funds are present only during the transaction. In this real-time payment method, funds can be transferred to the origin of deposit when the postage evidencing occurs, or preferably at a predetermined interval. Each transaction is logged to the meter database records as an historical record. It will be understood that refilling of the PSA in a prepayment method or payment in a post-payment method could be completed with an automatic credit card transaction. The following description of the present invention will include the real-time payment method, however either of the pre-payment, also described below, or post-payment methods can be used with the present invention as well.

Figure 3:
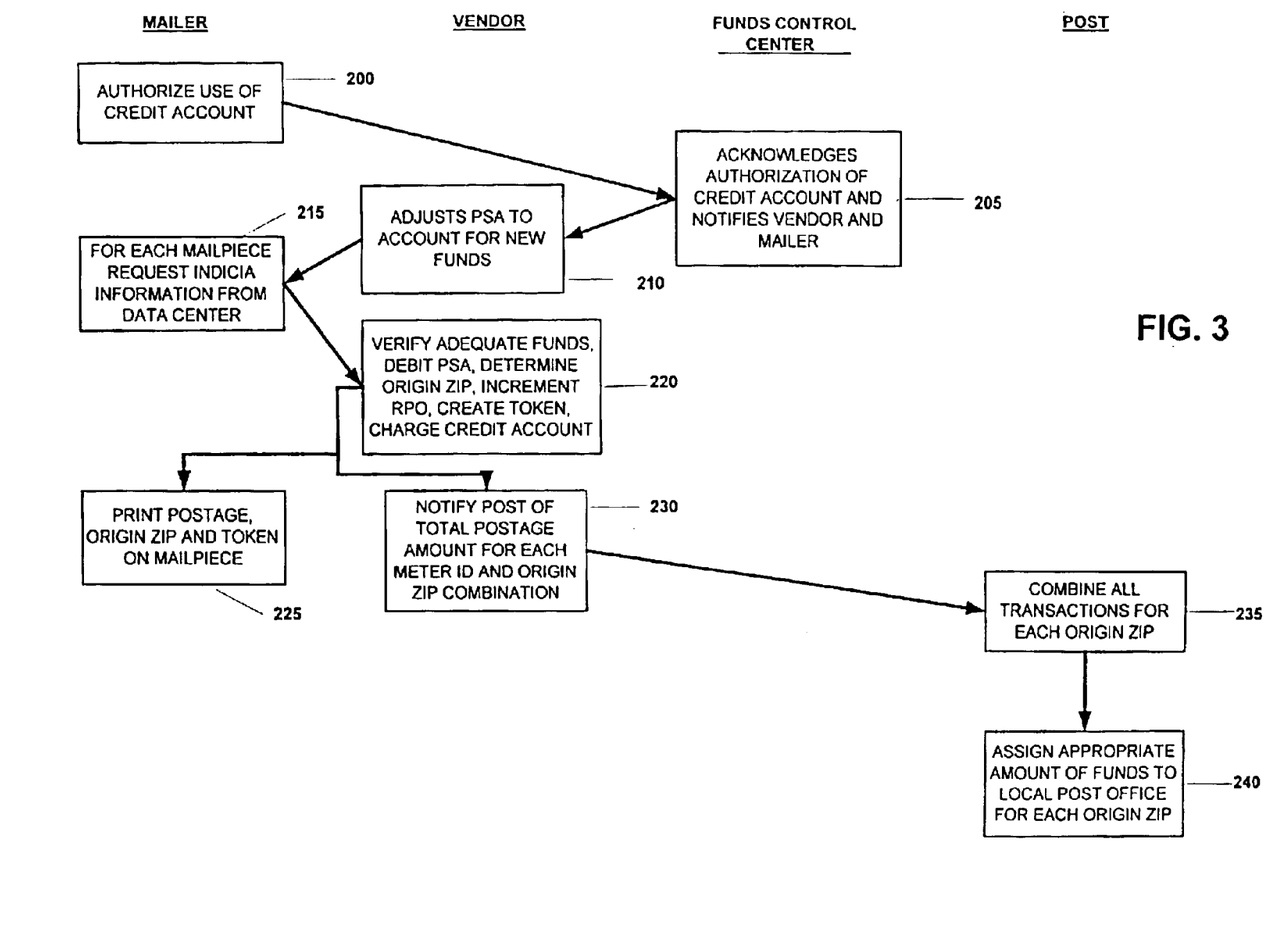
FIG. 3 is a flow chart of the process for trickle charge method for accounting and distributing funds to multiple origins of deposit in accordance with the present invention.

Referring now to FIG. 3, the process for distributing funds in accordance with a trickle charge method of payment begins at step 200, with the mailer, through PC 20, authorizing use of a credit card account to a funds control center, such as a bank. (Such authorization may occur through the Data Center to the funds control center.) At step 205, the funds control center acknowledges such authorization and notifies Data Center 30. At step 210, the Data Center activates the mailer's PSA by assigning the mailer's credit card account to it and notifies the mailer. At step 215, the mailer, through PC 20, initiates a request for indicium information from the Data Center 30, providing postal information, such as, postage amount and destination information. At step 220, Data Center 30 responds to the request by verifying sufficient funds are available, charging the mailer's credit card account, determining valid origin zip for the request, calculating a digital token or digital signature corresponding to the postal information provided with the request, and forwarding the indicium information including the digital token to PC 20. Data Center 30 also stores information relating to each transaction as a historical record to be forwarded to the Postal Service at a predetermined interval. At step 225, PC 20 obtains the indicium information from Data Center 30, generates an indicium bitmap and prints the indicium on the mailpiece. At some predetermined interval, for example daily, at step 230, Data Center 30 notifies the Postal Service of the total postage amount for each meter ID (PSA) and origin zip combination by forwarding the historical record to the Postal Service. At step 235, the Postal Service combines the transactions for each origin zip to determine the amount owed to each origin zip (local) post office. At step 240, the Postal Service assigns an appropriate amount of funds from the funds control center to each local post office. Alternatively, steps 235 and 240 could be performed at the Data Center or funds control center.)

Figure 4:
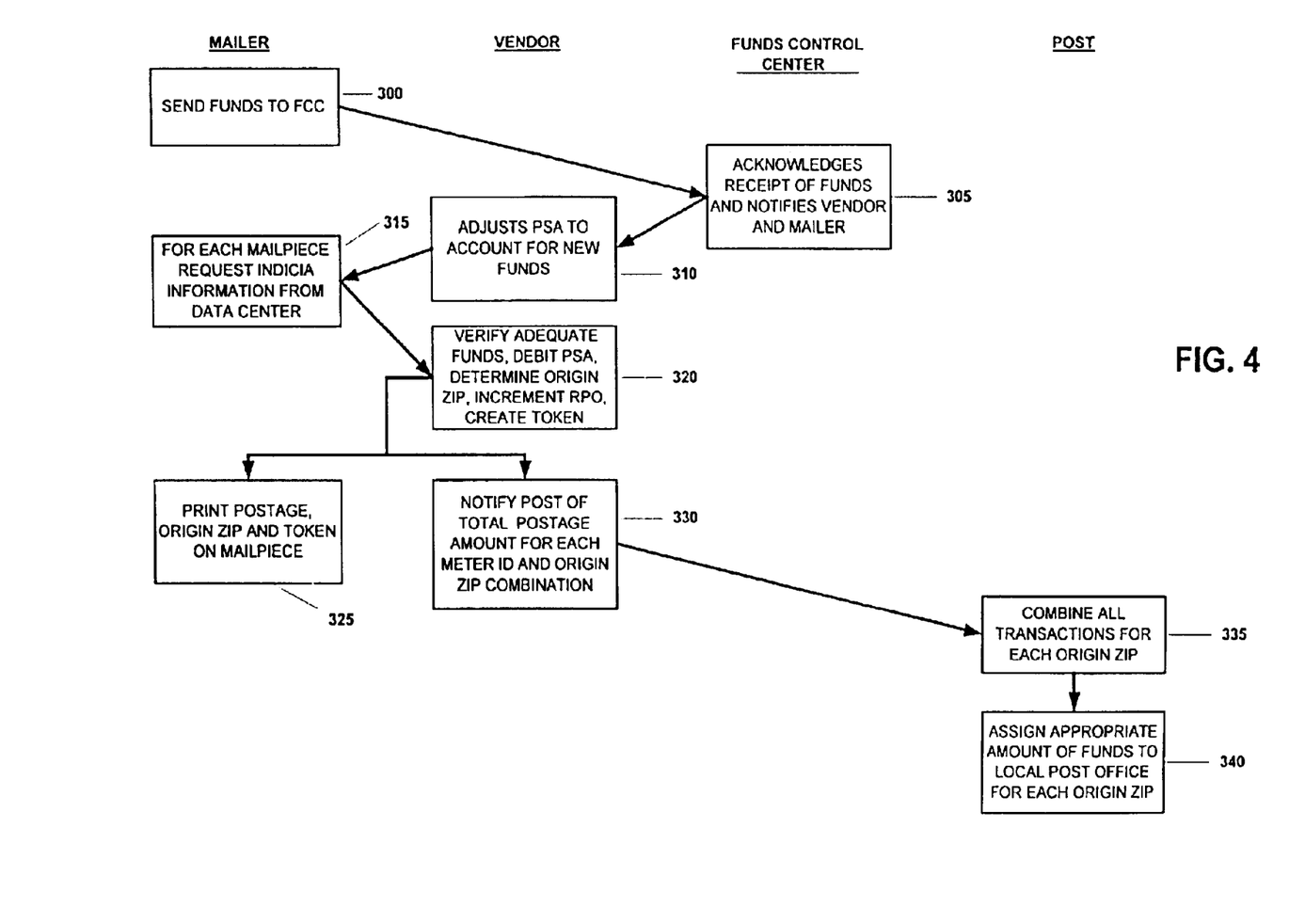
FIG. 4 is a flow chart of a prepayment method for accounting and distributing funds to multiple origins of deposit.

Referring now to FIG. 4, the process for distributing funds in accordance with a prepayment version of the present invention begins at step 300, with the mailer, through PC 20, sending funds to a funds control center, such as a bank. At step 305, the funds control center acknowledges such authorization and notifies Data Center 30. At step 310, the Data Center adjusts the PSA for the mailer to account for the additional funds and notifies the mailer. At step 315, the mailer, through PC 20, initiates a request for indicium information from the Data Center 30, providing postal information, such as, postage amount and destination information. At step 320, Data Center 30 responds to the request by verifying sufficient funds are available, debiting the mailer's account, determining valid origin zip for the request, calculating a digital token or digital signature corresponding to the postal information provided with the request, and forwarding the indicium information including the digital token to PC 20. Data Center 30 also stores information relating to each transaction as a historical record to be forwarded to the Postal Service at a predetermined interval. At step 325, PC 20 obtains the indicium information from Data Center 30, generates an indicium bitmap and prints the indicium on the mailpiece. At some predetermined interval, for example daily, at step 330, Data Center 30 notifies the Postal Service of the total postage amount for each meter ID (PSA) and origin zip combination by forwarding the historical record to the Postal Service. At step 335, the Postal Service combines the transactions for each origin zip to determine the amount owed to each origin zip (local) post office. At step 340, the Postal Service assigns an appropriate amount of funds from the funds control center to each local post office.

It will be understood that, although the embodiments of the present invention are described as postage metering systems, the present invention is applicable to any value metering system that includes transaction evidencing, such as monetary transactions, item transactions and information transactions. It will also be understood that, although the present invention is described with regard to origin zip codes, the present invention is suitable for any postal code utilized by various postal systems or any other postal accounting system (such as one where payment for parcels and letters are assigned to different postal departments).

While the present invention has been disclosed and described with reference to embodiments thereof, it will be apparent, as noted above, that variations and modifications may be made therein. It is, thus, intended in the following claims to cover each variation and modification that falls within the true spirit and scope of the present invention.

What is claimed is:

1. A method for processing a postage evidencing transaction comprising:

receiving at a data center a request from a remote postage printing system for postage evidencing information, the request including a postage amount;

determining at the data center a postal origin of deposit corresponding to the request;

accounting at the data center for the postage amount in a first account corresponding to the remote postage printing system;

accounting at the data center for the postage amount in a second account corresponding to the determined postal origin of deposit;

generating the postage evidencing information; and sending the generated postage evidencing information to the remote postage printing system.

2. The method of claim 1, wherein the second account is a subset of the first account.

3. The method of claim 1, wherein the postage evidencing information includes the determined postal origin of deposit.

4. The method of claim 1, wherein determining a postal origin of deposit further comprises:

extracting the postal origin of deposit from the request for postage evidencing information.

5. The method of claim 1, wherein accounting in a first account further comprises:

debiting the postage amount from the first account.

6. The method of claim 5, wherein accounting in a second account further comprises:

crediting the postage amount to the second account.

7. The method of claim 1, wherein accounting in a first account further comprises:

charging the postage amount to the first account.

8. The method of claim 7, wherein accounting in a second account further comprises:

crediting the postage amount to the second account.

9. The method of claim 1, wherein the request is received via an originating communication, and determining a postal origin of deposit further comprises:

obtaining an origin identifier of the originating communication;

obtaining an address corresponding to the origin identifier; and determining the postal origin of deposit by obtaining postal code information for the address.

10. The method of claim 9, wherein the originating communication is a phone call, and obtaining an origin identifier further comprises:

using caller ID to obtain a phone number from which the remote postage printing system initiated the originating communication, wherein the phone number is the origin identifier.

11. The method of claim 9, wherein the originating communication is received via a network, and obtaining an origin identifier further comprises:

determining a network address of the originating communication.

12. A data center for a postage metering system comprising:

a communication device to communicate with a plurality of remote postage printing systems;

a determining device to determine a postal origin of deposit corresponding to requests for postage evidencing information from the plurality of remote postage printing systems;

a plurality of first accounts each associated with a respective one of the plurality of remote postage printing systems; and a plurality of second accounts each associated with a respective postal origin of deposit, wherein when the data center receives a request for postage evidencing information, including a postage amount, via the communication device from one of the plurality of remote postage printing systems, the determining device determines a postal origin of deposit corresponding to the request, accounts for the postage amount in the first account associated with the remote postage printing system, accounts for the postage amount in the second account associated with the determined postal origin of deposit, generates the postage evidencing information, and sends the generated postage evidencing information to the remote postage printing system.

13. The data center of claim 12, wherein the data center accounts for the postage amount in the first account by debiting the postage amount from the first account and accounts for the postage value in the second account by crediting the postage amount to the second account.

14. The data center of claim 12, wherein the data center accounts for the postage amount in the first account by charging the postage amount to the first account and accounts for the postage value in the second account by crediting the postage amount to the second account.

* * * * *